US009258245B2

(12) United States Patent
Lau et al.

(10) Patent No.: US 9,258,245 B2
(45) Date of Patent: Feb. 9, 2016

(54) MULTIPLE CELL DEQUEUE FOR HIGH SPEED QUEUEING

(75) Inventors: Michael Lau, Rockville, MD (US); Rahul Durve, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 494 days.

(21) Appl. No.: 13/611,670

(22) Filed: Sep. 12, 2012

(65) Prior Publication Data

US 2014/0075444 A1   Mar. 13, 2014

(51) Int. Cl.
*H04L 12/28* (2006.01)
*H04L 12/875* (2013.01)

(52) U.S. Cl.
CPC .................. *H04L 47/56* (2013.01)

(58) Field of Classification Search
CPC ..... H04W 28/10; H04W 28/12; H04W 28/14; H04W 72/1242; H04W 72/1247; H04W 72/1252; H04W 72/1257; H04W 72/1263
USPC .......................... 370/395.2–395.43, 412–418
See application file for complete search history.

(56) References Cited

U.S. PATENT DOCUMENTS

| 5,903,735 | A | * | 5/1999 | Kidder et al. ............... 709/240 |
| 6,219,352 | B1 | * | 4/2001 | Bonomi et al. ............... 370/417 |
| 6,359,884 | B1 | * | 3/2002 | Vincent ....................... 370/389 |
| 6,389,019 | B1 | * | 5/2002 | Fan et al. ................. 370/395.42 |
| 6,477,144 | B1 | * | 11/2002 | Morris et al. ............... 370/230.1 |
| 7,782,885 | B1 | * | 8/2010 | Sabato et al. ................ 370/412 |
| 2002/0136230 | A1 | * | 9/2002 | Dell et al. .................... 370/416 |
| 2003/0202517 | A1 | * | 10/2003 | Kobayakawa et al. ..... 370/395.4 |
| 2007/0171929 | A1 | * | 7/2007 | Kim et al. ..................... 370/412 |
| 2011/0044170 | A1 | * | 2/2011 | Kure et al. .................... 370/235 |

* cited by examiner

Primary Examiner — Thai Hoang
(74) Attorney, Agent, or Firm — Brinks Gilson & Lione

(57) ABSTRACT

A system includes a task scheduler to select a queue from a port. The port includes a determined number of cell slots between pick opportunities. The task scheduler selects a queue at a pick opportunity. A queue manager connects with the task scheduler to pop cell packets from the selected queue, and to send update information to the task scheduler. The update information includes information of how the queue manager expects to fill the cell slots between the task scheduler selections. The task scheduler makes subsequent queue selections based on the update information.

17 Claims, 5 Drawing Sheets

| mdq_head_state[main] | mdq_head_state[sister] | Head Packet | 2$^{nd}$ Packet | Comments |
|---|---|---|---|---|
| 0 | 0 | Main Entry | Sister Entry | Init state |
| 1 | 0 | Sister Entry | Main Entry | |
| 1 | 1 | Main Entry | Sister Entry | |
| 0 | 1 | Sister Entry | Main Entry | |

Figure 7

MULTIPLE CELL DEQUEUE FOR HIGH SPEED QUEUEING

TECHNICAL FIELD

This disclosure relates to sending packets in a network, and to the scheduling of packets.

BACKGROUND

Advances in electronics and communication technologies can result in communication networks capable of communicating data at ever-increasing speeds. Consumers may be able to send and receive data across multitudes of sources at higher reliability and communication rates. Technology can continue to advance and communication networks grow in size, frequency of use and capability. Data can be communicated with greater efficiency, reliability and quality.

BRIEF DESCRIPTION OF THE DRAWINGS

The systems and methods may be better understood with reference to the following drawings and description. In the figures, like reference numerals designate corresponding parts throughout the different views.

FIG. 7 is a table showing exemplary head state transition and encoding.

DETAILED DESCRIPTION

The systems and methods described relate to a multi-dequeue system. Packets arriving into a network switch or router can be quantized into cells, classified based on their attributes, e.g., class of service, and sent to destination queues based on their final destination and the attributes. Multiple queues denoting different classes of service may be mapped to the same destination port. Algorithms, data structures and designs can use a task scheduler's pick function to dequeue cells destined to a port in the network while the task scheduler is determining the next pick. Multi-dequeue can include storing the last scheduler pick for a port and using the same queue for the port slot where there is no valid pick, e.g., where the task scheduler has not determined the next pick. For purposes of explanation, data structures and techniques are described to implement a double-dequeue scheme where one slot between scheduler picks has no valid pick. The techniques can be scaled, however, to fill multiple slots between valid task scheduler picks. Also, other implementation variants are possible to achieve multi-dequeue.

Figure 1:
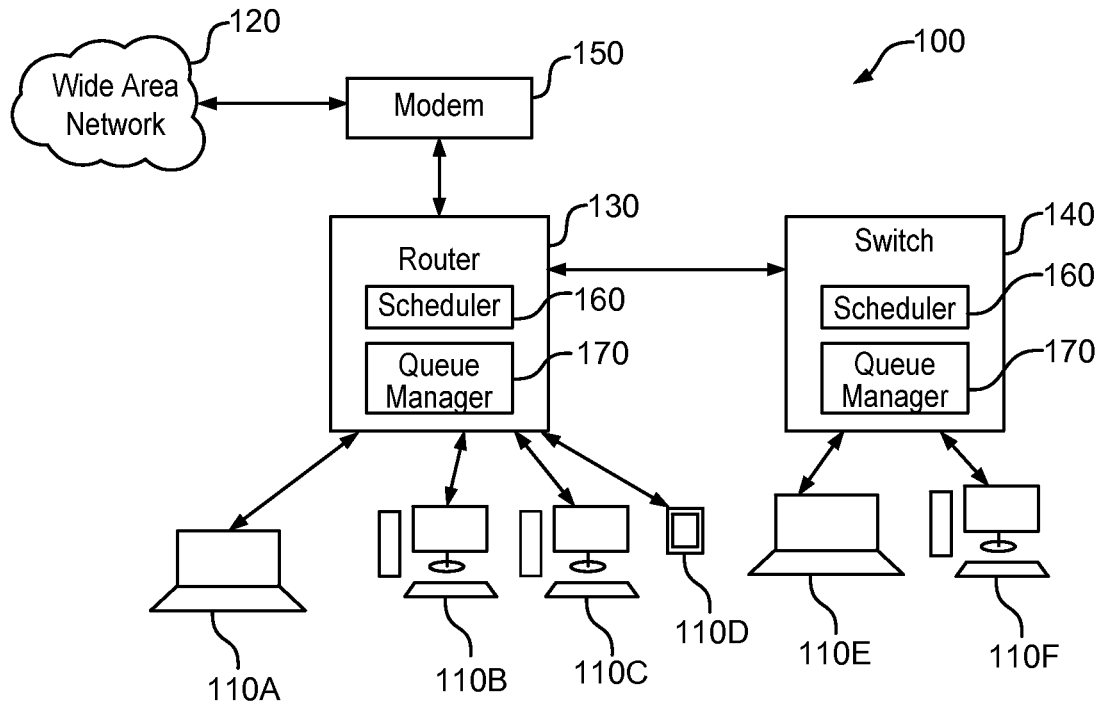
FIG. 1 is a block diagram of an exemplary network.

FIG. 1 is a block diagram of an exemplary network 100. The network 100 can be used for computing, communications, etc. Devices 110A-F connect to a wide area network 120, e.g., the Internet, via a router 130, a switch 140 and a modem 150. The devices 110A-F can also communicate with each other such as via a local area network. The devices 110A-F can include desk top computers, laptops, personal digital assistants (PDA's), printers, televisions, tablets, etc., and other devices capable of connecting to the network 100. The router 130 and the switch 140 can be implemented as separate devices or together in a single device. The router 130 and the switch 140 include a packet scheduler 160 and a queue manager 170 to help manage the flow of communication packets in the network 100.

Figure 2:
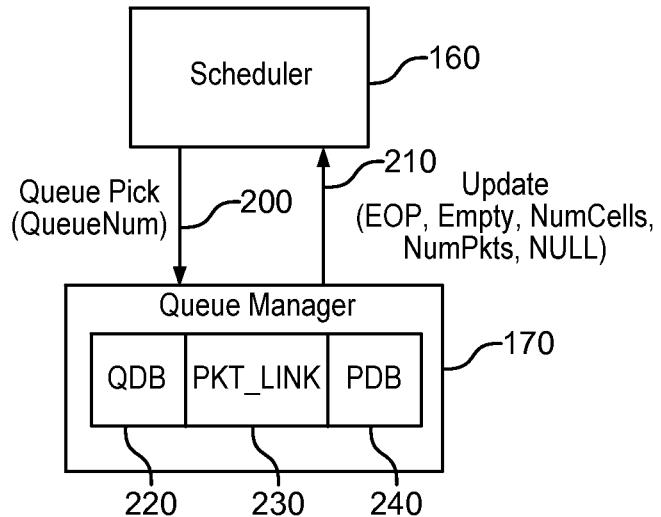
FIG. 2 is a block diagram of the exemplary packet scheduler 160 and queue manager.

FIG. 2 is a block diagram of the exemplary task scheduler 160 and queue manager 170 shown in more detail. The task scheduler 160 can pop packet cells from non-empty queues to destination ports in the network 100 by applying hierarchical scheduling algorithms on queues, class of service groupings, etc. At 200, the task scheduler 160 selects a queue from which to dequeue the next quantum or cell of the packet. Subsequent picks can be based on updates returned from the queue manager 170 to the packet scheduler 160. At 210, update information can be sent from the queue manager 170 to the scheduler 160. The update information can include whether an end of packet (EOP) data entry has been reached, the number of cells picked, the number of picks and whether the picked queue has gone empty. The update information can also include other information such as NULL to indicate to the task scheduler 160 that a selection slot will not be used for dequeue.

Depending on a number of queues and hierarchies, and the time taken by the queue to update its empty status, the task scheduler 160 can take multiple clock cycles to reach a decision. A need for more queues and greater flexibility in managing or classifying packets can drive more hierarchies in making scheduler decisions. For example, the task scheduler 160 may be used to distinguish between unicast and multicast packet traffic and class of service. The task scheduler 160 may also provide other features, including minimum bandwidth guarantees for a node, maximum bandwidth limits, strict priority, etc. Increasing the number of ports on the chip and port speeds can cause chip clock frequencies to increase. These trends can result in an increase in the number of clock cycles used for the task scheduler 160 to reach a decision, to the point that port speed cannot be sustained. For example, the task scheduler 160 may not be able to make dequeue decisions fast enough to fill the bandwidth afforded by the port. To fill the port's bandwidth, the task scheduler 160 can generate picks at shorter intervals or dequeue larger chunks of the packet with each pick. The first approach can lead to high design complexity and difficult timing closure. The scheduling logic is squeezed into fewer clock stages and/or bypass logic is added so that decisions taken over previous clock cycles can be changed based on current scheduler updates. The second approach can lead to wasted system bandwidth and buffer space, causing an increase in chip area and power.

To help provide a steady flow of cell packets from the queues to fill the bandwidth without needing to increase the number of picks and without other shortcomings of other approaches the task scheduler 160 and the queue manager 170 can alternatively or additionally perform multi-dequeue per pick. For multiple-dequeue, the queue manager 170 can include a queue database (QDB) 220, a start of packet pointer (PKT_LINK) memory 230 and a port database (PDB) 240. Queue state information including head and tail pointers, and head packet information can be stored in the QDB 220. The queues can be maintained as linked lists of start-of-packet (SOP) cell pointers in the PKT_LINK memory 230.

Figure 3:
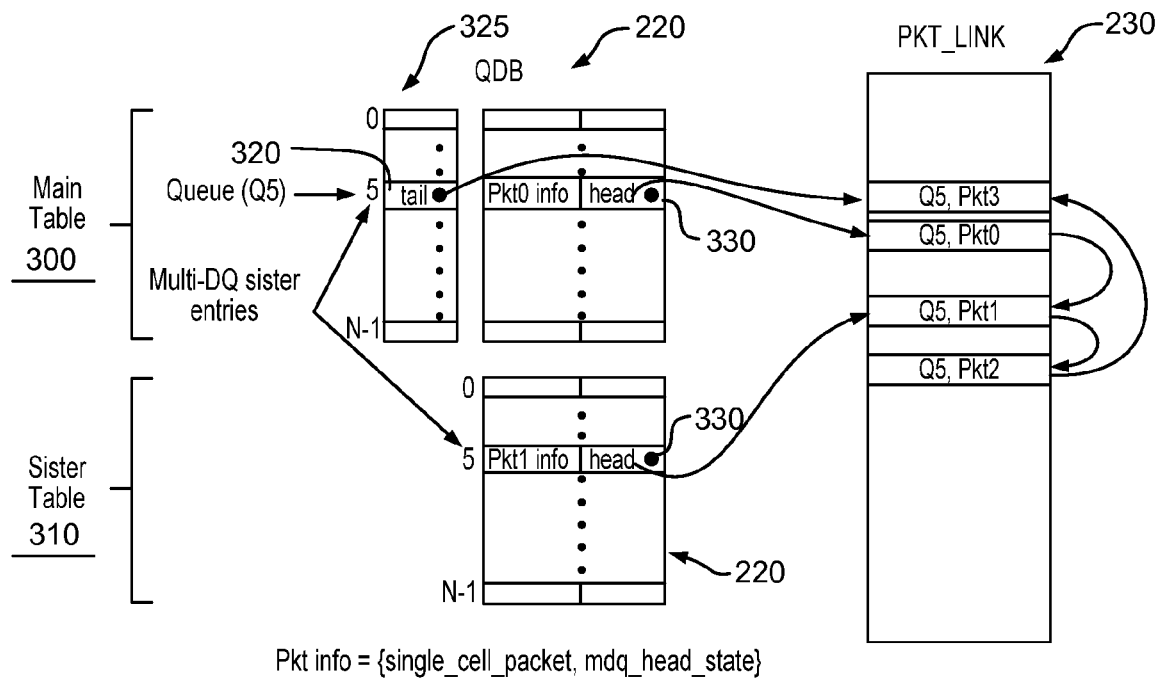
FIG. 3 is a block diagram of an exemplary data structure of a queue database.

FIG. 3 is a block diagram of an exemplary data structure of the QDB 220. To support multi-dequeue, a structure of the QDB 220 can be split into a main table 300 that holds the head packet information and head/tail queue state, and a multi-dequeue sister table 310 that holds information and pointer of the second packet in the queue. In the example, for packets Pkt0, Pkt1, Pkt2 and PKt3 being contained in PKT_LINK memory 230 for queue Q5, Pkt 0 head information is stored in the main table 300 and the next packet, Pkt1, head information is stored in the sister table 310. Therefore, the task scheduler 160 can determine the next packet in the queue before the next pick. Pkt info can also include information about the number of cells (NumCells) in the packet to be used in the multi-dequeue process, for example, to determine the number of cell being slotted. The number of sister tables 310 can vary depending on the number of packets the task scheduler 160 can look ahead to fill cell slots between picks. For example, if there are two cell slots between picks, a main table and one sister table can be used. If there are three cell slots between picks, a main table and two sister tables can be used, etc.

The sister table 310 can be held in physically separate memory, for example, so that the main and sister entries can be read simultaneously by the enqueue and dequeue logic to obtain the look ahead capability for computing task scheduler updates. Therefore, cell slots can be used effectively by trying to minimize empty slots. The tail pointer 320 can be held in a separate physical memory 325 so that the dequeue logic can update the head packet information 330 when multi-dequeue is enabled, without having to execute a read-modify-write or synchronizing the tail pointer with the enqueue logic. The task scheduler 160 can use the head and tail pointer information to determine when the queue is empty.

Figure 4:
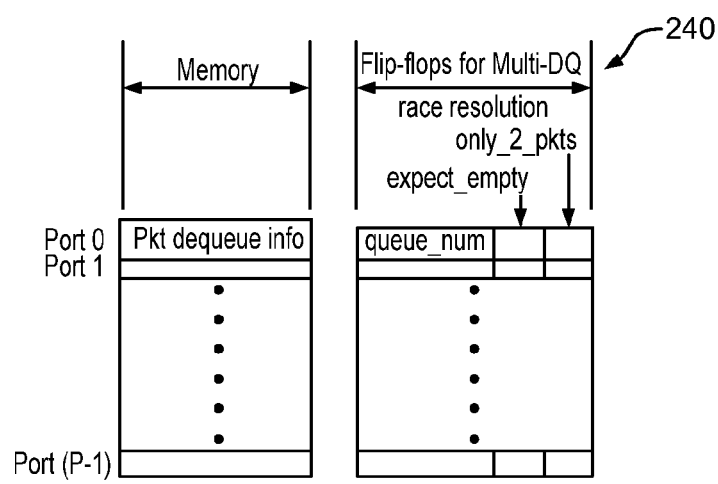
FIG. 4 is a block diagram of an exemplary port database.

FIG. 4 is a block diagram of an exemplary PDB 240 for multi-dequeue. Packet order to destination ports 0, 1 . . . P−1 is maintained. The Pkt dequeue info includes data buffer pointers, end-of-packet information, etc. The queue_num includes the queue number that is currently being dequeued for the port. The expect_empty field can be set on dequeue when an empty update is sent to the task scheduler 160 by the queue manager 170. The field can be cleared by enqueue if packets are enqueued to this queue while the last packet is being dequeued. If this bit is cleared by enqueue after dequeue has sent an empty update, dequeue write back to QDB 220 to clear q_not_empty is inhibited. The only_2_pkts field can be used for multi-dequeue. The field can be set by dequeue when q_2nd_ptr=q_tail_ptr when an EOP update is sent to the ES. When the EOP cell is dequeued and this bit is still set at the time, the dequeue does not attempt to fetch the third packet information by using the second packet pointer since there is no third packet at this point. This bit can be cleared by enqueue when a third packet is enqueued while the head is being dequeued. In such a case, the third packet fetch can proceed normally.

When a packet has started dequeueing, a different queue mapped to the same port is not scheduled until the packet reaches EOP. The ongoing packet state for each port can be tracked by being held in the PDB 240. In addition, multi-dequeue can include fields to allow computation of updates to the scheduler as well as to use past updates to make decisions during multi-dequeue slots. This information can be held in a Register File or static random access memory (SRAM) to save area and power. Some of the fields used by multi-dequeue can be held in flip-flops so that they can be accessed by logic to resolve race conditions.

Figure 5:
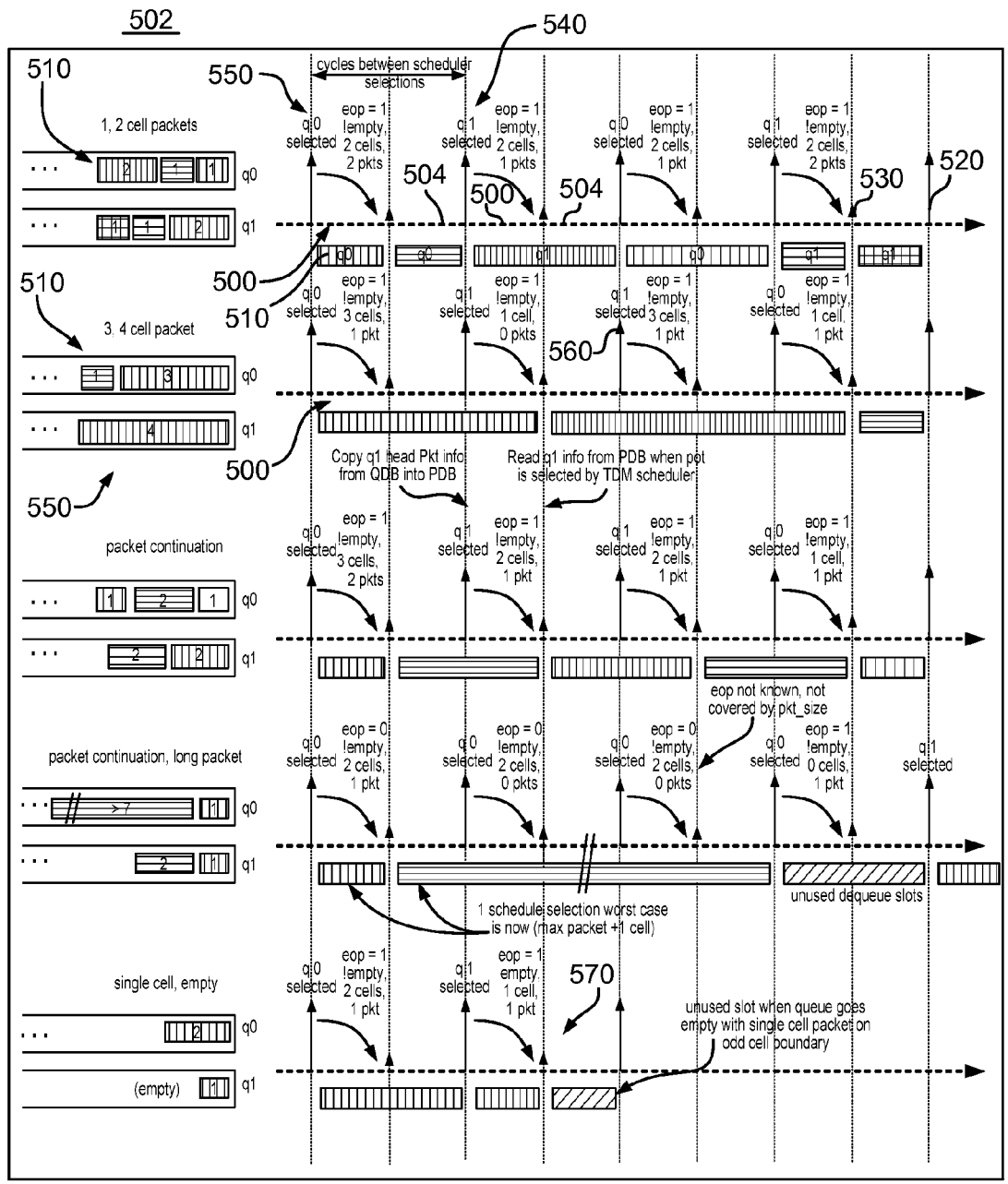
FIG. 5 is a block diagram of exemplary packet dequeue sequences.

FIG. 5 is a block diagram of an exemplary dequeue process. For purposes of explanation, two queues q0 and q1 are shown for a port 502. The methods and system can also work with more or less queues and multiple ports by applying the logic to the additional queues and ports. The queues q0 and q1 contain cell packets 510. The cell packets 510 can include different cell lengths such as 1 cell, 2 cells, 3 cells, 4 cell, etc. and greater than 7 cells. The cell packets 510 can be popped to the slots 500, 504 of the port 502. In this example, two cell slots 500, 504 are included between each pick opportunity (long arrows 520) of the task scheduler 160. The slots 502, 504 between the pick opportunities 520 is the time that is takes the task scheduler 160 to determine a pick based on hierarchy determinations, etc. In other examples, more or less slots may be included per pick. Therefore, the long arrows 520 represent opportunities for queue picks from the task scheduler 160 for this port 502. The short arrows 530 represent the times that cells 510 may be dequeued to the slots 504, even if the task scheduler 160 is not yet ready to determine a next pick for the port 502. With multi-dequeue, the queue manager 170 can act autonomously to fill the cell slot 504, e.g., based on the previous queue pick. A regular scenario is shown, where the expected multi-dequeue slot 504 is granted to the same port 502. In another example in FIG. 6, the slot 504 may not be granted.

In the example of FIG. 5, a multi-dequeue operation for a multi-dequeue enabled port 502 can start with a valid queue pick from the task scheduler 160. Since in this example there are two slots 500, 504 between picks 520, the queue manager 170 accounts for at least two cells ahead of time to update the task scheduler 160, and ensure that the slots expected for this port can be utilized optimally. The two cells may come from one or more cell packets 510. The systems and methods may also be used with other implementation that include more than two slots 500, 504 between picks 520. In that case, the queue manager 170 also takes account of the additional cells.

At the first pick 550, the task scheduler 160 selects q0 and communicates the selection to the queue manager. The queue manager 170 determines from the queue database 220 that there are two single cell packets in q0. The first packet is popped and dequeued during the current slot 510. The queue manager 170 expects to also pop the second packet in the future slot 504, and , therefore the queue manager 170 instructs the task scheduler 160 that it expects to pop a total of two packets to fill the two slots 500, 504. The queue manager 170 also expects that after dequeuing the packets in slots 500, 504, it will have reached the end of a packet, and so the queue manager 170 sends an update to the task scheduler 160 that an EOP occurred. This information can be used by the task scheduler 160 to determine what action to take at the next pick, e.g. pick 540. Since two cell packets 510 were sent and each cell packet 510 is one cell in length, the task scheduler 160 can pop a new cell packet 510 with the next pick. In this example, the task scheduler 160 next selects a two cell length cell packet 510 from q 1 for the next pick based for example on priority, etc. The queue manager 170 sends information to the task scheduler 160 that an EOP occurred, the cell slots 500 are not empty and two cells and one packet are expected to be dequeued.

If the packet of queue q0 at the head of the queue is a single cell, the multi-dequeue slot 504 could go unused unless a cell belonging to the 2nd packet q1 in the queue can be sent. Therefore, information for the first two packets can be stored in the QDB 220, and a sister queue entry is assigned to every queue. Packet information belonging to the head packet of queue q0 and the second packet of queue q1 can be read by the dequeue pipeline on every valid scheduler pick 520. In addition, the PDB 240 can be read at the scheduled port number. The queue manager 170 can determine or compute updates based on the number of cells in the two packets. A cell belonging to the head packet is dequeued on the scheduler pick 520 if there is no ongoing packet in the PDB 240, otherwise a cell belonging to the ongoing packet is sent out.

If the scheduler queue pick is expected to be used in the multi-dequeue slot, the QDB head packet information is cached in the PDB 240, and the packet is committed by the queue manager to the scheduler as part of the updates. Thereafter, the entry in the PDB 240 can serve to identify the head packet q0 as an ongoing packet on the port, regardless of whether its SOP cell was dequeued at the time of the scheduler pick.

Popping a packet from a queue can involve a read-modify-write operation on the QDB 220. It is possible for the enqueue logic to change queue status, tail packet information and 2nd/next head packet information while the dequeue logic is executing the read-modify-write for a packet pop. This type of race can be resolved with the logic of the queue manager 170. However in the case of multi-dequeue, the QDB entry of the current queue is not always available to read when executing a packet pop. This can occur when the EOP of a packet is sent during a multi-dequeue slot, or when a new scheduler pick is received while the EOP of the current packet is still pending, because the read port of the QDB 220 is used to fetch information for the scheduler new pick. To pop a packet in these cases, the 2nd packet pointer is copied from the QDB 220 into the PDB 240 when the head packet starts. If the QDB 220 is not accessible at the time the EOP cell is sent, the 2nd packet pointer in the PDB 240 is used to fetch the next (3rd) packet information.

The next row 550 is an example of cell packets 510 with one, two and four cell in length. Queue q0 is selected and a cell packet 510 of three cells in length is picked. The queue manager 170 sends an EOP of 1 to indicate that the end of packet occurs within a time for the next valid pick to be made. In addition, information is sent that the cell slots are not empty, and that one packet of three cells in length was sent. At the next pick, a cell packet 510 of four cells in length is selected from queue q1. The queue manager 170 sends to the task scheduler 160 an EOP of 0 since no cell slots 500 are available for the next valid pick 560. Therefore, a next pick 560 of the task scheduler 160 is dropped and not used based on the EOP of 0 status.

For larger sized cell packets 500, e.g., greater than seven cells in length, the queue manager 170 can allow the task scheduler 160 to pick the next cell packet whenever the large cell packet is slotted, without considering when the large packet ends. Therefore, there may be unused slots after large cell packets are delivered, but consequences of this are less since a large, continuous packet was delivered that can maximize bandwidth. In addition, there may be unused slots when the queue goes empty with single call packets on odd cell boundaries, such as at 570.

In general, however, multi-dequeue can include storing the last pick of the task scheduler 160 and using the queue for the cell slot 500 of a port 502 where there is no valid pick, such as at the multi-dequeue picks 530. Updates to the task scheduler 160 in response to a valid pick can account for the multi-dequeue cell slots 504. An EOP indication can be given in advance to force a new scheduling cycle in the expectation that multi-dequeue slots 504 will be filled by cells 510 from an ongoing packet. Similarly, cell count updates can expect multi-dequeue slots 504 to be used.

Figure 6:
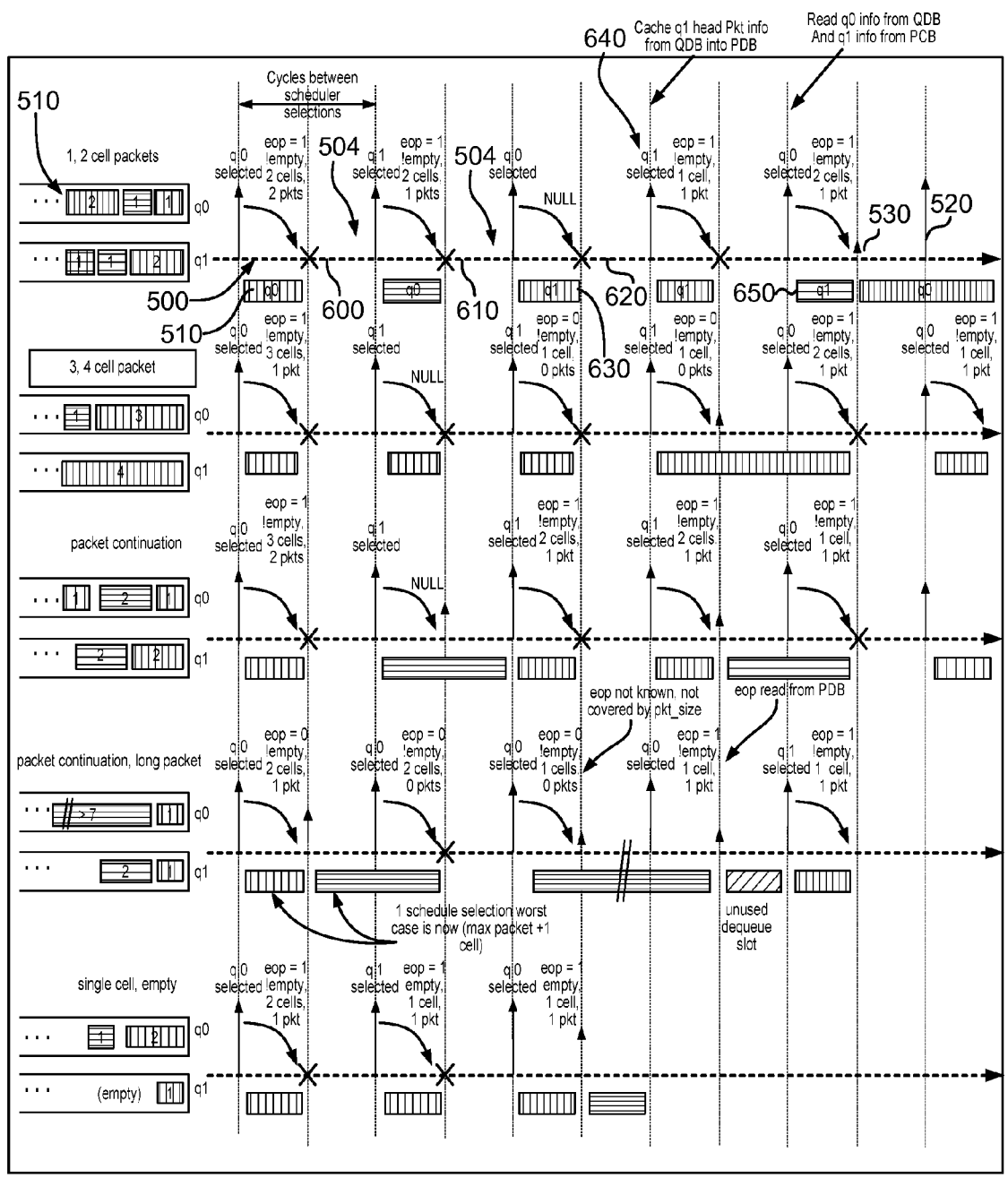
FIG. 6 is a block diagram of exemplary dequeue sequences in which some multi-dequeue slots do not materialize.

FIG. 6 is a block diagram of exemplary dequeue sequences in which some multi-dequeue slots are not available, e.g., from a port scheduler. An "X" represents the lost slot, e.g., the beginning of a slot that cannot be used. It may happen that after sending updates in the expectation of a multi-dequeue slot 504, it fails to occur, e.g., due to lack of port credits or due to oversubscription. In either case, the promised cells 510 can be sent in the slots 504 that do materialize. Updates to the scheduler can compensate for the lost slots 500. This may include adjusting the cell count and EOP indication, or sending a null update.

In this example, the task scheduler 160 selects q0 and the queue manager expects to dequeue first two single-cell packets from q0. The queue manager 170 can send an EOP of 1 to the task scheduler 160 since a cell slot 600 is presumed to be available after the current slot 500. When the slot 600 arrives, it turns out it is not available. In the third slot, the task scheduler 160 next selects queue q1. However, since the second packet from q0 has not yet completed its dequeue, the queue manager 170 uses the current slot to send the second single cell packet of q0. The queue manager also expects slot 610 to be available in the future and uses the task scheduler 160 selection of queue q1 to determine that it will use slot 610 to dequeue the first cell of the two cell length packet at the head of queue q1. The queue manager 170 returns an EOP of 1 since it expects to complete the two cell packet in the slot after the following scheduler selection. When slot 610 arrives, it turns out it is not available for dequeue for this port.

At the next pick, queue q0 is selected. However, since slot 610 was unavailable, no cells from the two cell length queue q1 packet have been dequeued. The first cell slot is used for the first part 630 of the queue q1 packet and the queue manager 170 expects to send the second cell in the future slot 620. The queue manager 170 returns a NULL to the task scheduler 160 since no packets from queue q0 will be able to be started before the next selection 640 occurs. The packet q0 pick is dropped and not slotted, and the task scheduler 160 can choose a queue to pick a cell packet at the next pick opportunity, in this case by picking q1 at 640. Therefore, the cell packet to be slotted in the next available slot is the single cell packet from q1 650.

FIG. 7 is a table showing exemplary head state transition and encoding. Since the QDB head, 2nd packet and tail fields are held in separate memories, the head packet can be popped by writing the 3rd packet information in its place and toggling the mdq_head_state bit in this memory slice to indicate that the new head is now the 2nd packet. The mdq_head_state bits in the main and sister entries together determine which of the two holds the head packet. When it is determined whether the main or sister entry contains the head packet, the other entry contains the $2^{nd}$ packet information.

This method of popping works when there are more than two cells in the queue to guarantee that the 3rd packet pointer can be read using the 2nd packet pointer. Otherwise, there may be a race condition between enqueue and dequeue regarding queue status that spans slots. To resolve this race, three fields of the PDB 240 can be held in flops to allow handshaking between the enqueue and dequeue pipelines including the currently active queue_number, an expect_empty bit and an only__2_pkts bit. When an EOP update is given to the scheduler for an ongoing packet, the dequeue sets the expect_empty bit if this is the last packet currently in the queue (q_head_ptr==q_tail_ptr), and sets the only__2_pkts bit when the 2nd packet is the last packet in the queue (q__2nd_ptr==q_tail_ptr). At the time of the EOP update, an empty update is given to the scheduler if the expect_empty bit is being set.

During an enqueue, the enqueue logic checks to determine if the destination queue of the packet matches the queue number at the destination port address in the PDB. If the enqueue logic determines that the expect_empty bit set, it treats the queue as being empty. A queue activation message is sent to the scheduler and the packet being enqueued is written into the QDB 220 as the new head packet. The enqueue then clears the expect_empty bit. This inhibits the dequeue from marking the queue empty in the QDB 220 once the EOP cell of the ongoing packet is actually sent out. The expect_empty handshaking therefore can maintain consistency in the queue empty and activation messages.

If the enqueue determines that the only_2_pkts bit is set when enqueueing a packet, the bit is cleared so that the dequeue knows to fetch the next (3rd) packet information by means of the 2nd pointer copy in the PDB 240, when the ongoing packet reaches EOP. The numcells_updt, numcells_sent, numpkts_updt and numpkts_sent fields can be used to keep track of the updates provided to the scheduler and what has actually been sent.

The tables and data structures used for multi-dequeue can be implemented in a chip datasheet and programming model. Additionally, it may be possible to infer the existence of multi-dequeue based on advertised scheduler features and flexibility from which a maximum pick frequency can be estimated. Port rates that can be supported by such scheduler can include pick rates that are higher than the rate of the scheduler. During multi-dequeue pause granularity and unused slots may be documented in the datasheet and visible in specific tests.

While various embodiments have been described, it will be apparent that many more embodiments and implementations are possible. Accordingly, the systems and methods are not to be restricted except in light of the attached claims and their equivalents.

What is claimed is:

1. A system, comprising:
    a network device that includes a task scheduler to select a queue from a port, wherein the port includes a determined number of cell slots between pick opportunities; and
    the network device also including a queue manager connected with the task scheduler, the queue manager to dynamically pop multiple cell packets from the logical queue to fill the determined number of cell slots, and send update information to the task scheduler, the update information including information of how the queue manager expects to dynamically fill the determined number of cell slots with additional cell packets from the selected queue before the next queue selection from the task scheduler for the given port,
    wherein the task scheduler makes subsequent queue selections for the given port based on the update information sent from the queue manager.

2. The system of claim 1, wherein the task scheduler subsequently selects the queue from the port based on the update information.

3. The system of claim 1, wherein the network device includes a memory that stores a queue database connected with the queue manager, the queue database containing information on the cell packets.

4. The system of claim 3, wherein the cell packets include a current packet and a next packet, and the queue manager pops the current packet and the next packet at the same time.

5. The system of claim 3, wherein the cell packets include a current cell packet and a next cell packet, and wherein the queue database includes a main table and a sister table to store pointers to the current cell packet and the next cell packet.

6. The system of claim 5, wherein the main table and the sister table are located in physically separate memories.

7. The system of claim 5, wherein the main table further stores a pointer to a packet tail to determine a last packet in the queue.

8. The system of claim 1, wherein the update information includes an end of packet information.

9. The system of claim 8, wherein the end of packet information indicates if a cell slot is available at a next pick opportunity.

10. The system of claim 1, wherein a picked cell packet is dropped if an expected cell slot is not available.

11. The system of claim 10, wherein the update information indicates to the task scheduler that the picked cell packet was dropped.

12. A system, comprising:
    a network device that includes a task scheduler to select a queue from a port, wherein the port includes a determined number of cell slots between pick opportunities;
    the network device also including a queue manager connected with the task scheduler, the queue manager to pop cell packets from the logical queue and send update information to the task scheduler, the update information including information of how the queue manager expects to fill the cell slots with additional cell packets from the selected queue before the next queue selection from the task scheduler for the given port, wherein the task scheduler makes subsequent queue selections for the given port based on the update information sent from the queue manager; and
    the network device including a memory that stores a port database connected with the queue manager, the port database including information to track an ongoing packet state for the port and fields to resolve race conditions to maintain consistency in queue empty and activation states.

13. A method, comprising:
    dynamically determining, with a queue manager included in a network device, multiple cell packets in a queue to pop to fill a predetermined number of cell slots of a port between task scheduler picks of a task scheduler;
    providing, with the queue manager, update information to the task scheduler indicative of the multiple cell packets in the queue to dynamically pop to fill the predetermined number of cell slots of the port; and
    determining, with the task scheduler, a next cell packet in the queue to pop based on the update information.

14. The method of claim 13, wherein the update information includes end of packet information.

15. The method of claim 14, further comprising determining, with the task scheduler, if a cell slot is available at a next pick opportunity based on the end of packet information.

16. The method of claim 13, wherein the update information includes a number of the multiple cell packets in the queue to dynamically pop to fill the predetermined number of cell slots of the port.

17. The method of claim 13, further comprising the task scheduler dropping a picked cell packet if an expected cell slot is not available.

* * * * *